United States Patent Office 3,287,793
Patented Nov. 29, 1966

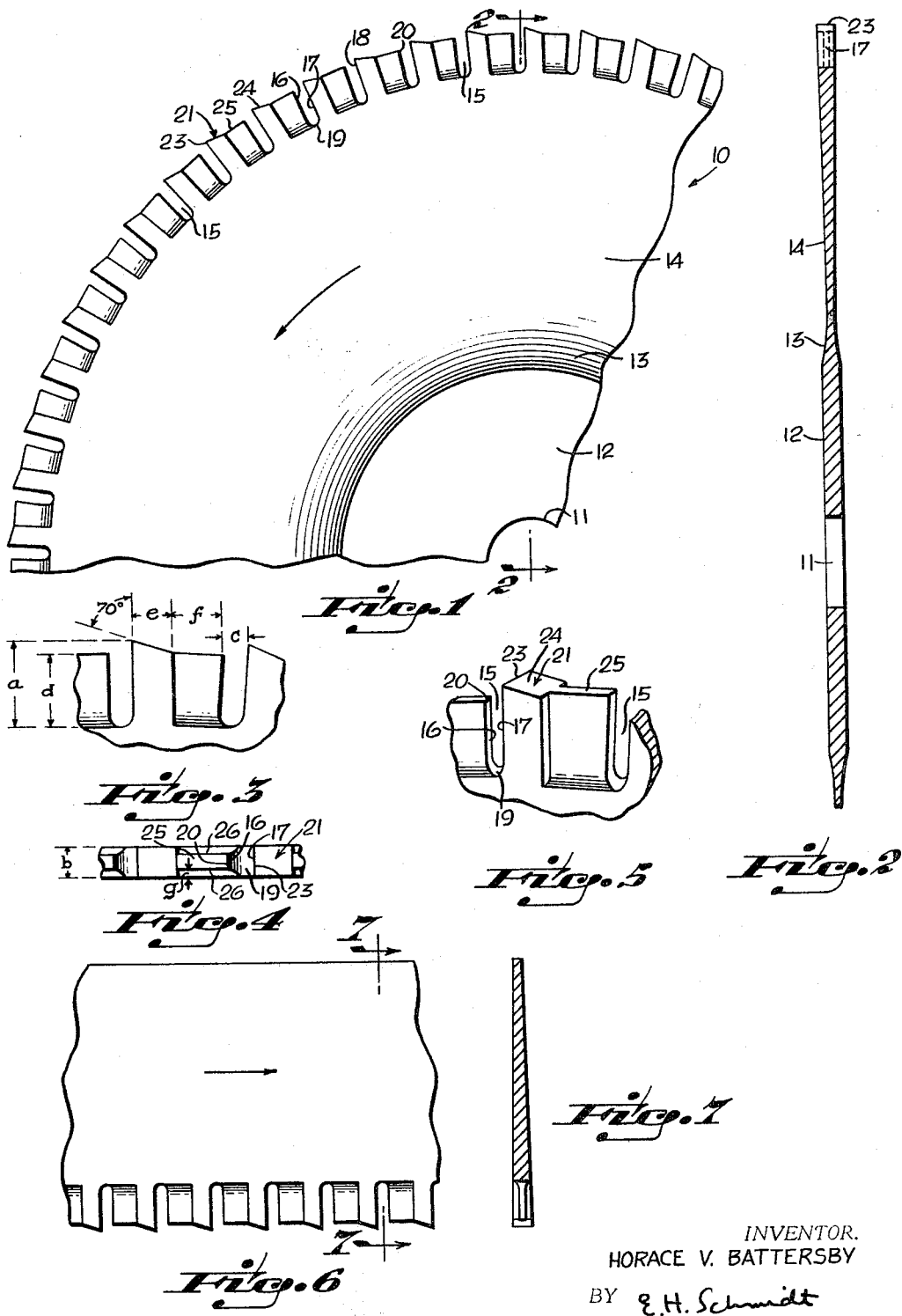

3,287,793
SAW TEETH
Horace V. Battersby, Cortez Star Route,
Bradenton, Fla.
Filed Dec. 22, 1965, Ser. No. 515,780
1 Claim. (Cl. 29—103)

This invention relates to saws and is particularly concerned with the design construction, shape and configuration of saw teeth in a saw blade for rapid, effective and efficient cutting of a wide variety of materials, particularly composite materials having components of widely divergent densities. This application is a continuation-in-part of my application Serial No. 305,048 filed August 28, 1963, now abandoned.

While the present invention represents an advanced step in the sawing art with respect to the sawing of solid materials such as plastics, metals and the like, the invention is particularly adapted for the sawing of combined structures, such as materials of a less dense nature covered or sheathed by a metal. Heretofore, in the cutting of such composite material as, for instance, wood stripping covered with aluminum facing or edging material, extreme difficulty has been experienced in attaining a smooth cut surface. Regardless of painstaking effort and either high or low speed of saw tooth contact with the material, and variations in feed, a ragged cut has almost invariably resulted. The metal sheathing tends to either indent into the softer material or to be flared outwardly to form a jagged edge which is not only unsightly, but unsuited for abutting use against adjoining materials. In some instances, in the use of the presently conventional saws, minute particles of metal dust are dragged inwardly by the teeth of the saw blade to the lighter density material to be scattered throughout its mass. Such a condition is particularly noticeable when sawing a body of porous light-weight material, such as foamed plastic encased within a thin metal covering such as tinplate, iron or aluminum.

It has been found that with the structure of the present invention and the formation and design of the teeth here presented, a clean cut may be secured through both metals alone and composite structures including metal laminates with a tooth contact speed within present day conventional ranges and with a normal rate of feed. While the present invention is shown in the form of a disc saw for purposes of illustration, it will of course be understood that various aspects of the present inventive concept may be beneficially applied in the tooth construction of reciprocating or band saws, as well as ordinary hand saws, and that the invention is therefore not limited to the specific adaptation of the basic concept to a disc saw of the character herein set forth.

Thus it may be broadly stated that the present invention has among its objects that of providing a novel and improved tooth and saw construction particularly adapted for sawing of composite structures. Another object of the invention is to provide an improved tooth construction operative to rapidly and smoothly sever metals and composite materials including metals. Numerous other objects, features and advantages of the present invention will be apparant from a consideration of the following specification, taken in conjunction with the accompanying drawings, in which:

FIG. 1 is a fragmentary side elevation of one form of the present invention, as applied in formation of a disc type saw;

FIG. 2 is a sectional view taken on the line 2—2 of FIG. 1;

FIG. 3 is an enlarged side view of one of the teeth of the saw shown in FIG. 1;

FIG. 4 is an outer edge view of the saw tooth as shown in FIG. 3;

FIG. 5 is an enlarged fragmentary perspective view of the saw tooth embodying the invention looking in the direction of the trailing edge thereof;

FIG. 6 is a fragmentary side elevation of a straight saw blade of the type suitable for use in band saws, reciprocating saws or hand saws; and FIG. 7 is a vertical cross-section of the saw blade shown in FIG. 6, taken along the line 7—7 thereof in the direction of the arrows.

Referring now in detail to the drawings, the numeral 10 refers, generally, to a fragmentary portion of a saw disc formed with saw teeth embodying the present invention. It will be understood that the material of the disc is not particularly critical, the material contemplated being steel of such composition and tempering as is conventional in the art of saw construction. The center of the blade is formed with the usual arbor aperture 11 and an outwardly extending hub portion 12 of a uniform thickness, preferably commensurate with the maximum width of the blade teeth. The outer periphery of the hub 12 terminates in an inwardly-extending shoulder bevel or radius 13 beyond which the blade continues outwardly as indicated at 14 from the shoulder 13 in a uniformly increasing thickness from to the outer edges of the individual teeth. Such tapering of the blade, outwardly from its hub, constitutes what is commonly referred to as a hollow ground blade. In the circular or disc saw herein presented by way of example, the individual teeth formed on the periphery of the blade are defined between the generally radially-inwardly-extending gullets or chip pockets 15. These recesses are preferably formed with parallel leading and trailing side walls 17 and 16 respectively, wherein the leading wall 17 is a true radius from the center of the arbor and forms at its outer extremity a front face portion 18 of the cutting tooth. The width of the gullet is uniform throughout its length and terminates in a curved bottom wall 19 joining the side walls 16 and 17.

The teeth themselves, generally indicated by the numeral 21 are each formed between the gullets 15, and have a cutting face defined by the front face portion 18, which front face portion is co-extensive with the leading wall 17 of the gullet. The face of the tooth therefore lies in a flat traverse plane coincident with a radius from the center of the disc, and terminates in a transverse cutting tip 23 parallel with the axis of the disc. The tip 23 lies in a radial plane parallel with the axis to present a straight, transverse cutting edge of neutral angle. The thickness of the blade, due to its "hollow ground" character hereinbefore mentioned, constitutes an edge of maximum transverse thickness. From the tip 23 the tooth inclines in a straight plane 24 rearwardly and inwardly inclined, to provide a clearance angle of approximately 20 degrees. That is, the face of the clearance surface 24 lies in a plane approximately at an angle of 70 degrees with respect to the front cutting face portion 18 of the tooth. The cutting edge may therefore be described as of neutral rake and 70 degrees included angle. The clearance surface 24 extends rearwardly from the cutting tip 23 to somewhat less than one-half the length of the tooth from gullet to gullet. Since the clearance plane extends inwardly from the apex or tip 23 of the blade, it will be seen that the tooth thickness will diminish slightly from the maximum thickness at the cutting tip 23. The clearance surface 24 terminates rearwardly from the tip 23 at a transverse merger with a rearwardly extending land 25, which, in the case of circular saws, is preferably formed on a curvature with the axis of the blade as its center. The land 25 terminates rearwardly at the shorter trailing wall of the gullet 15 in a trailing edge 20.

From this construction of the blade, it will be seen that the tip 23 of the tooth is at the apex of the angle of approximately 70 degrees between the face portion 18 and the clearance surface 24. Thus, a substantial back-up mass is provided for the cutting edge 23. Since the peripheral face of the tooth is constituted by a clearance surface of somewhat less than one-half the length along the side of the tooth, and the other half of the peripheral tooth surface subtends the clearance surface, there is provided substantial strength in the tooth, found to be necessary for smooth cutting. The gullets, being substantially equal in depth to the width along the side of the tooth afford an ample recess for reception of sawdust, whether wood, metal or plastic. The normal high speed rotation of the blade provides for automatic clearing of the gullets from accumulated material as the gullet of each successive blade emerges from the work. Such depth of the gullet further insures cool operation as the saw is rotated at high speed. To enhance automatic clearing of the gullets 15 and self-cooling action of a saw, the land portions 25 of the teeth are each formed with equal, opposed relief cuts or recesses 26, their individual depths being approximately equal to one-quarter the maximum thickness of the blade at the teeth.

With respect to the dimensions of the spacing, thickness, gullet depth, peripheral lengths etc. of the saw tooth hereinabove described, it will be understood that they will vary somewhat from saw to saw depending upon its size and type. The dimensional proportions, however have been found to be quite critical for efficient and smooth cutting consistant with long saw life. By way of example, and to enable others to practice the invention with a minimum of experimental effort, I have found that the following dimensions to be particularly effective in circular or disc saws ranging in diameter from approximately 6 to 16 inches.

| | Inches |
|---|---|
| $a$ = overall gullet depth | $5/16$ |
| $b$ = tooth thickness | $7/64$ |
| $c$ = gullet width (tooth spacing) | $1/8$ |
| $d$ = tooth cutting edge projection | $3/64$ |
| $e$ = length of rearward portion of incline measured perpendicular to face | $5/32$ |
| $f$ = length of land portion of tooth | $7/32$ |
| $g$ = relief recesses in land portion of tooth each approximately one-fourth thickness of tooth. | |

In the operation of saws utilizing my improved saw tooth construction, the deep gullets combined with the relief cuts or recesses at each side of the tooth land portions prevents loading of the teeth spaces and sides of the blade with saw cuttings, as well as providing for cooler running of the saw. The blunt square face of the tooth cutting edges act like chisels to cut clear and thereby produce fine chips rather than dust, further minimizing the possibility of clogging at the teeth. The blunt cutting edges of the teeth, moreover, stay sharp longer than ordinary saw teeth, and provide a stronger tooth construction, whereby tooth vibration is kept to an absolute minimum, this feature also contributing to the over-all smooth cutting performance of a saw.

While I have illustrated and described herein particular embodiments of my improved saw tooth and saws utilizing such saw teeth, it is to be understood that these embodiments are given by way of example only and not in a limiting sense. My invention, in brief, comprises all the modifications and embodiments coming within the scope and spirit of the following claim.

What I claim as new and desire to secure by Letters Patent is:

A saw comprising a planar saw blade and a set of identical saw teeth formed along a peripheral edge portion of said blade, each tooth being defined between uniformly spaced identical gullets in said blade, said gullets extending approximately normal to said peripheral edge portion of said blade and being defined by opposed, parallel side wall faces, one face of each gullet extending outwardly of said peripheral edge of said blade to constitute the cutting face of a tooth, the tip at the outer end of each cutting face comprising a straight transverse cutting edge defined by a line perpendicular to the mid-plane of said saw blade, said tip being defined by an included angle of substantially 70 degrees, the peripheral tooth surface trailing said edge being in a flat rearwardly and inwardly-inclined plane for approximately one-half the length of the tooth from gullet to gullet, the remainder of the tooth peripheral surface comprising a rearwardly-extending land, the sides of said saw blade being tapered for gradually decreasing thickness of the blade from the tips of said saw teeth, the body portions of each of said teeth at opposed side portions directly under said rearwardly-extending lands being formed with relief cuts of approximately one-quarter the blade thickness at the teeth.

References Cited by the Examiner

UNITED STATES PATENTS

| 318,938 | 6/1885 | Allen. | |
|---|---|---|---|
| 690,785 | 1/1902 | Sosna | 143—140 |
| 2,528,226 | 10/1950 | Holdebrant. | |
| 2,673,580 | 3/1954 | Pierson. | |

FOREIGN PATENTS

| 1,120,121 | 4/1956 | France. |
|---|---|---|
| 519,866 | 3/1955 | Italy. |

WILLIAM W. DYER, JR., *Primary Examiner.*

HARRISON HINSON, *Examiner.*